United States Patent [19]

Rempel et al.

[11] 4,446,683

[45] May 8, 1984

[54] KNIFE DRIVE

[75] Inventors: William Rempel; Bouko J. Kor, both of Winnipeg, Canada

[73] Assignee: Canadian CoOperative Implements Limited, Winnipeg, Canada

[21] Appl. No.: 426,965

[22] Filed: Sep. 29, 1982

[51] Int. Cl.³ ............................................ A01D 55/02
[52] U.S. Cl. ................................... 56/296; 56/16.2; 56/257; 56/297
[58] Field of Search ................ 56/6, 15.7, 15.8, 16.2, 56/257, 259, 296, 297, DIG. 10

[56] References Cited

U.S. PATENT DOCUMENTS

| | | | |
|---|---|---|---|
| 1,598,843 | 9/1926 | Bauercamper | 56/16.2 |
| 2,603,935 | 7/1952 | Pirtle | 56/259 |
| 3,262,254 | 7/1966 | van der Lely et al. | 56/6 |
| 3,577,716 | 5/1971 | McCarty et al. | 56/259 |
| 4,067,179 | 1/1978 | Schneider | 56/297 |
| 4,161,858 | 7/1979 | Gerrits | 56/DIG. 10 |
| 4,206,583 | 6/1980 | Week et al. | 56/15.8 |
| 4,236,370 | 12/1980 | Shaver | 56/297 |
| 4,246,742 | 1/1981 | Clark et al. | 56/297 |

FOREIGN PATENT DOCUMENTS

| | | | |
|---|---|---|---|
| 1517232 | 3/1968 | France | 56/296 |
| 46394 | 12/1962 | Poland | 56/296 |

*Primary Examiner*—Paul J. Hirsch
*Attorney, Agent, or Firm*—Stanley G. Ade

[57] ABSTRACT

Hinged tables for swathers usually are provided with individual knife sections and the center section of this knife is difficult to drive. This invention eliminates the necessity for a center section drive by using a two section knife on a three section table with each knife section extending through one wing section and part of the center section. The knives are driven from the outer ends and are allowed to flex over the hinge area. The wing sections are provided with rigid guard bars and a flexible section of guard bars secured to the inner end of the rigid guard bar and is secured by the other end to the center of the center section by means of a swivel or sliding connection.

28 Claims, 11 Drawing Figures

U.S. Patent   May 8, 1984   Sheet 1 of 4   4,446,683
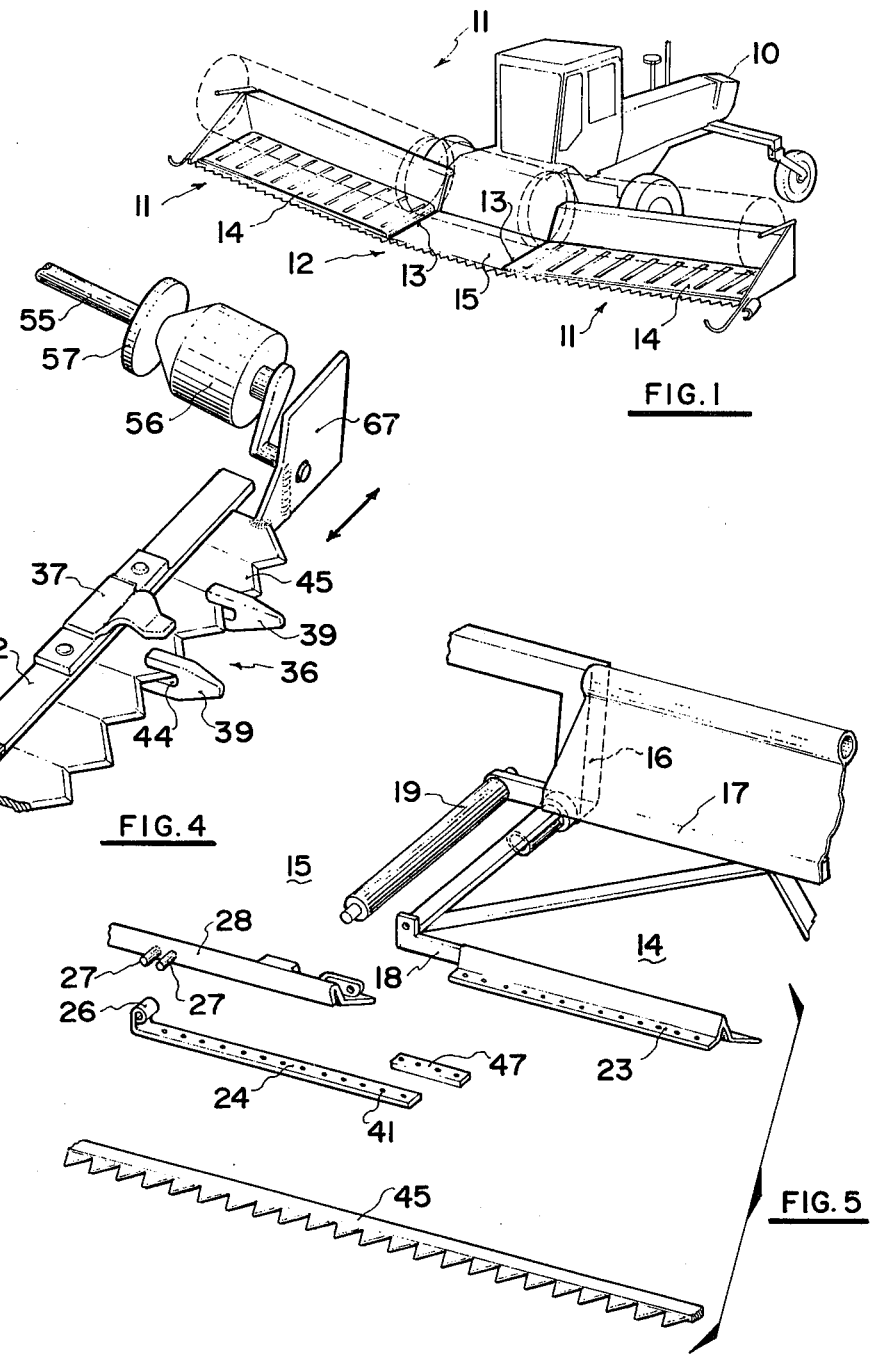

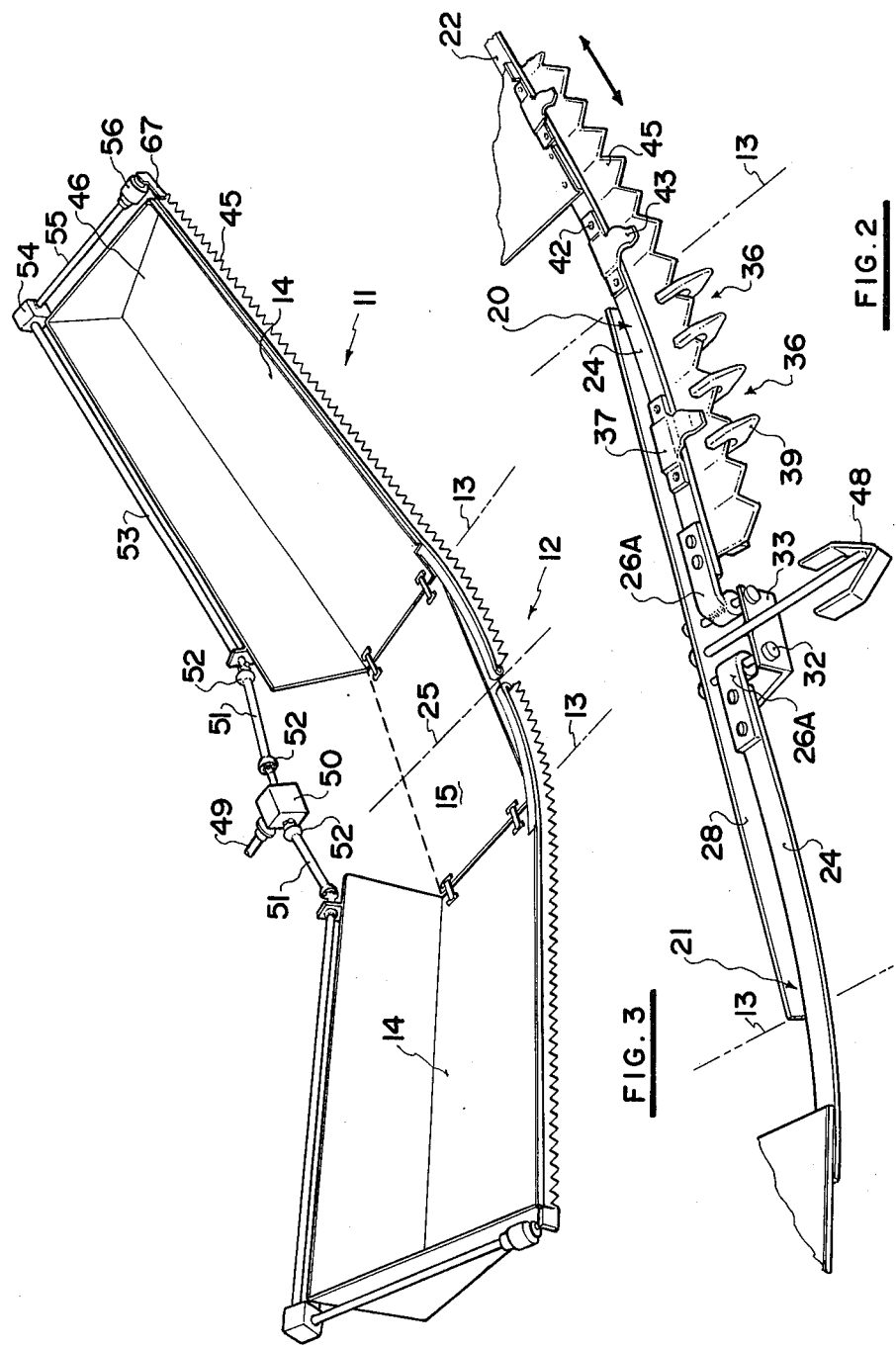

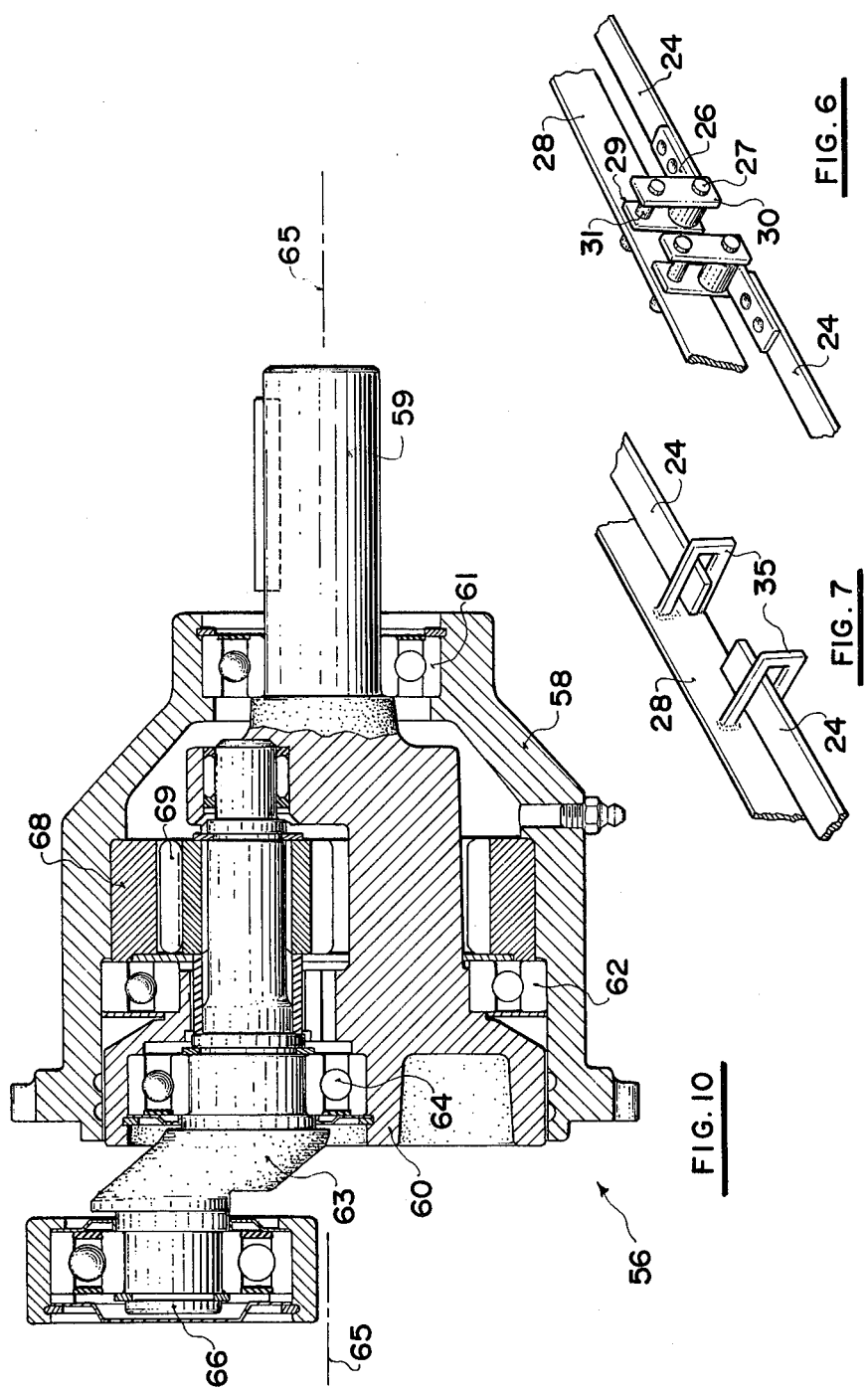

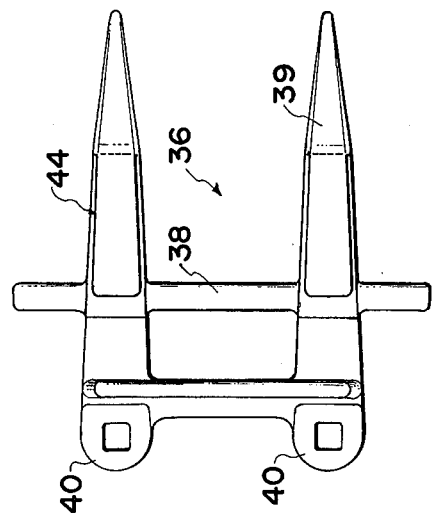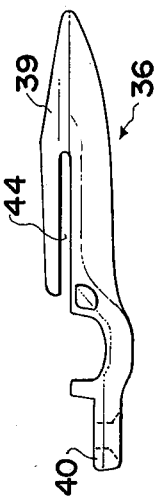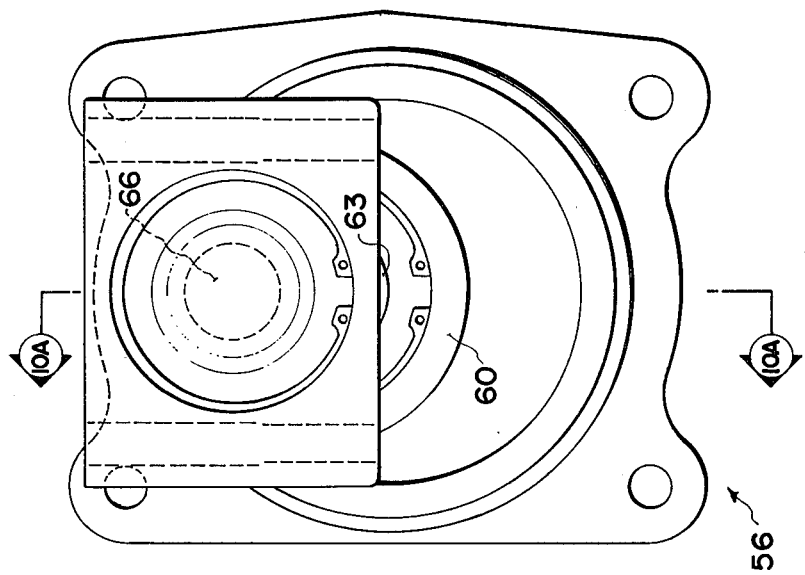

KNIFE DRIVE

BACKGROUND OF THE INVENTION

This invention relates to new and useful improvements in flexible knife assemblies particularly suitable for use with relatively large swather headers which include a center section and a wing section pivoted for limited movement upon each side of the center section.

Hinged tables used specifically with a three section header, suffer several disadvantages, the largest one being the driving of the center section knife.

SUMMARY OF THE INVENTION

This invention overcomes this particular disadvantage by eliminating the center knife drive. This is accomplished by utilizing a two section knife on a three section table with each knife being driven from each end of the outer table section and spanning part of the center section so that the knife can flex over the hinged area between the wing section and center section.

In accordance with the invention there is provided, in a swather header assembly including a center section and a wing section hingedly secured for limited movement one to each end of the center section; knife means for said sections, said knife means comprising in combination a pair of knife assemblies, each of said knife assemblies including a rigid guard bar secured to the front of each wing section, guards and hold-downs secured to said guard bar along the length thereof, a flexible guard bar section secured by one end thereof to the inner end of said rigid guard bar, means to mount the other end of said flexible guard bar section substantially centrally along the front of said center section, guards and hold-downs secured to said flexible guard bar sections, a flexible knife for each knife assembly each mounted for reciprocation through each said knife assembly and extending along said rigid guard bar and said flexible guard bar to adjacent said other end thereof and drive means operatively connected to each of said knives to reciprocate same between said guards and hold-downs on said wing section and said center section, each of said knives spanning the hinged securement of the respective wing section with the center section.

Another aspect of the invention provides a swather comprising in combination a center section and a wing section hingedly secured for limited movement one to each end of said center section, knife means for said sections, said knife means including a pair of knife assemblies, each of said knife assemblies including a rigid guard bar secured to the front of each wing section, guards and hold-downs secured to said guard bar along the length thereof, a flexible guard bar section secured by one end thereof to the inner end of said rigid guard bar, means to mount the other end of said flexible guard bar section substantially centrally along the front of said center section, guards and hold-downs secured to said flexible guard bar sections, a flexible knife for each knife assembly each mounted for reciprocation through each said knife assembly and extending along said rigid bar and said flexible guard bar to adjacent said other end thereof and drive means operatively connected to each of said knives to reciprocate same between said guards and hold-downs on said wing section and said center section, each of said knives spanning the hinged securement of the respective wing section with the center section.

It has been found that such an arrangement permits the flexing of the wing sections of approximately 12° from the horizontal either upwardly or downwardly therefrom.

Another advantage of the invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the best mode shown to the applicant and of the preferred typical embodiment of the principles of the present invention, in which:

DESCRIPTION OF THE DRAWINGS

FIG. 1 is a partially schematic isometric view of a tractor with a three section header attached thereto.

FIG. 2 is a partially schematic isometric view of the center section of the knife assembly.

FIG. 3 is a fragmentary isometric view of the two wing sections and the center section with the knife assembly in position.

FIG. 4 is a fragmentary enlarged isometric view of one end of one rigid end of the guard bar showing the drive to one knife.

FIG. 5 is a fragmentary isometric exploded view of the junction between one wing and the center section.

FIG. 6 is a fragmentary isometric view showing one method of connecting the inner ends of the flexible guard bar to the center section.

FIG. 7 is a view similar to FIG. 6 but showing an alternative method of attachment.

FIG. 8 is a top plan view of one of the guards per se.

FIG. 9 is a side view of FIG. 8.

FIG. 10 is an enlarged cross sectional view of one of the knife drive gear boxes along the line 10—10 of FIG. 11.

FIG. 11 is an end view of FIG. 10 taken from the lefthand side thereof.

In the drawings like characters of reference indicate corresponding parts in the different figures.

DETAILED DESCRIPTION

Proceeding therefore to describe the invention in detail, reference to FIG. 1 will show a tractor 10 ahead of which is attached a swather collectively designated 11 consisting of a header assembly which includes a center section collectively designated 12 and a wing section collectively designated 11 hingedly secured to each side of the center section along a hinge line identified by reference character 13.

Inasmuch as the hinging of wing sections to center sections of swather headers is well known, it is not believed necessary to show details of the hinging mechanism except to say that it permits the wing sections to hinge upwardly and downwardly relative to the center section for approximately 12° upon either side of the horizontal.

Each wing section includes a swather canvas or table 14 driven from the tractor by conventional means (not illustrated) and depositing cut swath to the center section opening indicated by reference character 15. The structure of the table assembly is conventional and reference to FIG. 5 will show that the table components are mounted by conventional means upon a table lift frame 16 with the wing sections consisting of a rear frame member 17 and a front frame member 18 and a canvas roller 19 being journalled between the inner ends of these frame members in a conventional manner.

Knife means are provided in conjunction with a conventional reel (not illustrated) and is identified generally by reference character 20.

It consists of a pair of knife assemblies collectively designated 21 each knife assembly including a rigid cutter bar 22 secured to the front of each wing section 11 to a flanged support 23 secured in turn to the front frame member 18 of each wing section.

This rigid cutter bar or guard brace terminates outboard of the hinge line 13 between the wing section and the center section and has secured to this inner end, a flexible guard brace or bar 24 which acts as a continuation of the rigid guard bar and spans the hinge line or junction between the wing section and the center section and is secured by the other or inner end thereof adjacent the center line 25 of the center section as clearly shown in FIGS. 2 and 3. Alternative means are provided to mount the inner end of this flexible bar 24 to adjacent the center of the center section and FIGS. 6 and 7 show the alternative means.

In FIG. 6, an eye member 26 is secured to the inner end of the flexible guard bar 24 and acts as a bearing and engages around a pin 27 which extends forwardly of the front member 28 of the center section and forms part of a bracket support including rear plate 29, front plate 30 and spacing pin or attachment pin 31.

In FIG. 2, the arrangement is similar except that instead of the eye bearing 26 being situated above the plane of the flexible bar 24, it is situated below the plane of the bar. This eye bearing in FIG. 2 is indicated by reference character 26A and is mounted upon a pin 32 extending through the front member 28 of the center section and through an angulated bracket 33 also extending from the center section member 28.

In FIG. 7, the inner ends 34 of the flexible guard bar 24 is mounted for sliding movement within an apertured bracket 35 extending from the front member 28 as clearly shown.

Any of the mountings illustrated in FIGS. 2, 6 or 7 permit the bar to flex if the wing sections move upwardly or downwardly relative to the horizontal or to the center section.

Each of the rigid guard bars or cutter bars 22 is provided with a plurality of spaced knife guards collectively designated 36 and corresponding hold-downs collectively designated 37. FIGS. 8 and 9 show details of the guards 36 which include a cross piece 38, a pair of spaced and parallel forwardly extending guard members 39, and attachment lugs 40 enabling same to be secured to the guard bar 22 and to extend forwardly therefrom in spaced pairs as clearly illustrated for example in FIG. 4. Similar guard bars are secured in a spaced relationship along the flexible guard brace or bar 24 and in FIG. 5, the attaching apertures 41 are shown.

The hold-downs are conventional and include the attaching lugs 42 and the forwardly and downwardly extending hold-down portion 43. These are attached to the upper side of the fixed guard bar 22 and the movable guard bar 24 as clearly illustrated.

The spaced and parallel forwardly extending portions 39 include the knife clearance and bearing slots 44 illustrated in FIG. 9 which support a flexible knife section 45 which extends from adjacent the outer ends 46 of each wing section, cross the hinge line 13 to adjacent the inner end 34 of the flexible guard bar or brace 24 as clearly shown in FIGS. 2, 3 and 4.

It will be appreciated that the flexible guard bar or brace being secured to the inner end of the rigid guard bar or brace 22, permits the flexing to occur and that the inner end portion of the flexible knife follows this curvature yet is still mounted for reciprocation throughout its entire length.

It will also be noted that the connection between the inner end of the rigid guard bar 22 and the outer end of the flexible guard bar 24 is outboard of the hinge line 13 and in FIG. 5, a brace strap 47 spans this junction and is bolted to both sections to connect them together as one unit.

It should also be noted that a crop divider 48 extends forwardly from the center of the front member 28 of the center section to divide the crop upon each side of the small area between the inner ends of the flexible knives which of course do not meet fully.

Reference to FIGS. 4, 10 and 11 show means to reciprocate the flexible knives it being understood that there is one drive means adjacent the outer end of each wing section as clearly shown in FIG. 3. A main drive shaft 49 is operatively connected to the tractor power takeoff (not illustrated) and extends to a gear box 50 with secondary drive shafts 51 extending from each side thereof via universal joints 52. These in turn lead to the wing section drive shaft 53 which in turn extend to outer gear box 54. Knife drive shafts 55 extend from these outer gear boxes 54 to the knife drive components 56 via coupling 57.

These components 56 include a housing 58 and an input drive shaft 59 extending from coupling 57. A form of crank 60 is journalled within the housing via bearings 61 and 62 and is rotated by the input shaft 59.

An output crank 63 is journalled for rotation within bearings 64, at the front of the member 60 and offset from the center line 65 and the crank end 66 is connected to a plate 67 secured to the outer end of the flexible knife 45.

A fixed ring gear 68 is mounted within the housing and a pinion 69 is secured to the inner end of 63 and engages the ring gear. Rotation of the input shaft 59 causes rotation of the member 60 and the location and configuration of the crank 63 together with the engagement of the pinion gear 69 with the ring gear 68 causes the output crank 66 to reciprocate in a horizontal plane thus transferring rotary motion to reciprocal motion and reciprocating the knives 45.

Any flexing is allowed for with the knife flexing with the flexible guard bar portions 24. It should be pointed out that the flexible guard bars are similar in construction to a leaf spring and it should also be noted that the table hinge lines 13 must be parallel to the flat surface of the flexible bars 24 in order to permit the necessary flexing.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. In a three section table-type swather header assembly including a center section and a wing section hingedly secured for limited movement one to each end of the center section; knife means for said sections, said knife means comprising in combination a pair of knife assemblies, each of said knife assemblies including a rigid guard bar secured to the front of each wing section, guards and hold-downs secured to said guard bar along the length thereof, a flexible guard bar section secured by one end thereof to the inner end of said rigid guard bar, means to mount the other end of said flexible guard bar section substantially centrally along the front of said center section, guards and hold-downs secured to said flexible guard bar sections, a flexible knife for each knife assembly each mounted for reciprocation through each said knife assembly and extending along said rigid guard bar and said flexible guard bar to adjacent said other end thereof and drive means operatively connected to each of said knives to reciprocate same between said guards and hold-downs on said wing section and said center section, each of said knives spanning the hinged securement of the respective wing section with the center section.

2. The invention according to claim 1 in which the connection of said flexible guard bar with said rigid guard bar is situated downward of the hinged securement of the respective wing section with the center section.

3. The invention according to claim 1 in which said means to mount the other end of said flexible guard bar section includes a mounting for said other end pivotally securing same to the front of said center section.

4. The invention according to claim 2 in which said means to mount the other end of said flexible guard bar section includes a mounting for said other end pivotally securing same to the front of said center section.

5. The invention according to claim 1 in which said means to mount the other ends of said flexible guard bar sections includes a longitudinal sliding mounting for said other ends, situated upon the front of said center section.

6. The invention according to claim 2 in which said means to mount the other ends of said flexible guard bar sections includes a longitudinal sliding mounting for said other ends, situated upon the front of said center section.

7. The invention according to claim 3 in which said mounting includes a pivot pin extending forwardly of said center section and a pivot bearing formed on said other end of said flexible guard bar engaging over said pivot pin, and a crop divider centrally located on the front side of said center section between said pivot pins.

8. The invention according to claim 4 in which said mounting includes a pivot pin extending forwardly of said center section and a pivot bearing formed on said other end of said flexible guard bar engaging over said pivot pin, and a crop divider centrally located on the front side of said center section between said pivot pins.

9. The invention according to claim 5 in which said longitudinal sliding mounting includes a flexible guard bar apertured bracket secured to and extending forwardly of said front of said center section, said other end of said flexible guard bar being slidably mounted and supported within said apertured bracket and a crop divider centrally located on the front side of said center section and between said brackets.

10. The invention according to claim 6 in which said longitudinal sliding mounting includes a flexible guard bar apertured bracket secured to and extending forwardly of said front of said center section, said other end of said flexible guard bar being slidably mounted and supported within said apertured bracket and a crop divider centrally located on the front side of said center section and between said brackets.

11. The invention according to claim 1, 2 or 3 in which said drive means includes a gear box mounted in each of said wing sections and a crank arm operable by said gear box, said crank arm being operatively connected to said knife adjacent the outer end thereof.

12. The invention according to claim 4, 5 or 6 in which said drive means includes a gear box mounted in each of said wing sections and a crank arm operable by said gear box, said crank arm being operatively connected to said knife adjacent the outer end thereof.

13. The invention according to claim 7, 8 or 9 in which said drive means includes a gear box mounted in each of said wing sections and a crank arm operable by said gear box, said crank arm being operatively connected to said knife adjacent the outer end thereof.

14. The invention according to claim 10 in which said drive means includes a gear box mounted in each of said wing sections and a crank arm operable by said gear box, said crank arm being operatively connected to said knife adjacent the outer end thereof.

15. A swather assembly comprising in combination a center section and a wing section hingedly secured for limited movement one to each end of said center section, knife means for said sections, said knife means including a pair of knife assemblies, each of said knife assemblies including a rigid guard bar secured to the front of each wing section, guards and hold-downs secured to said guard bar along the length thereof, a flexible guard bar section secured by one end thereof to the inner end of said rigid guard bar, meams to mount the other end of said flexible guard bar section substantially centrally along the front of said center section, guards and hold-downs secured to said flexible guard bar sections, a flexible knife for each knife assembly each mounted for reciprocation through each said knife assembly and extending along said rigid bar and said flexible guard bar to adjacent said other end thereof and drive means operatively connected to each of said knives to reciprocate same between said guards and hold-downs on said wing section and said center section, each of said knives spanning the hinged securement of the respective wing section with the center section.

16. The invention according to claim 15 in which the connection of said flexible guard bar with said rigid guard bar is situated outboard of the hinged securement of the respective wing section with the center section.

17. The invention according to claim 15 in which said means to mount the other end of said flexible guard bar section includes a mounting for said other end pivotally securing same to the front of said center section.

18. The invention according to claim 16 in which said means to mount the other end of said flexible guard bar section includes a mounting for said other end pivotally securing same to the front of said center section.

19. The invention according to claim 15 in which said means to mount the other ends of said flexible guard bar sections includes a longitudinal sliding mounting for said other ends, situated upon the front of said center section.

20. The invention according to claim 16 in which said means to mount the other ends of said flexible guard bar sections includes a longitudinal sliding mounting for said other ends, situated upon the front of said center section.

21. The invention according to claim 17 in which said mounting includes a pivot pin extending forwardly of said center section and a pivot bearing formed on said other end of said flexible guard bar engaging over said pivot pin, and a crop divider centrally located on the front side of said center section between said pivot pins.

22. The invention according to claim 18 in which said mounting includes a pivot pin extending forwardly of said center section and a pivot bearing formed on said other end of said flexible guard bar engaging over said pivot pin, and a crop divider centrally located on the front side of said center section between said pivot pins.

23. The invention according to claim 19 in which said longitudinal sliding mounting includes a flexible guard bar apertured bracket secured to and extending forwardly of said front of said center section, said other end of said flexible guard bar being slidably mounted and supported within said apertured bracket and a crop divider centrally located on the front side of said center section and between said brackets.

24. The invention according to claim 20 in which said longitudinal sliding mounting includes a flexible guard bar apertured bracket secured to and extending forwardly of said front of said center section, said other end of said flexible guard bar being slidably mounted and supported within said apertured bracket and a crop divider centrally located on the front side of said center section and between said brackets.

25. The invention according to claim 15, 16 or 17 in which said drive means includes a gear box mounted in each of said wing sections and a crank arm operable by said gear box, said crank arm being operatively connected to said knife adjacent the outer end thereof.

26. The invention according to claim 18, 19 or 20 in which said drive means includes a gear box mounted in each of said wing sections and a crank arm operable by said gear box, said crank arm being operatively connected to said knife adjacent the outer end thereof.

27. The invention according to claim 21, 22 or 23 in which said drive means includes a gear box mounted in each of said wing sections and a crank arm operable by said gear box, said crank arm being operatively connected to said knife adjacent the outer end thereof.

28. The invention according to claim 24 in which said drive means includes a gear box mounted in each of said wing sections and a crank arm operable by said gear box, said crank arm being operatively connected to said knife adjacent the outer end thereof.

* * * * *